US008869650B1

(12) United States Patent
Harris et al.

(10) Patent No.: US 8,869,650 B1
(45) Date of Patent: Oct. 28, 2014

(54) VARIABLE POSITION FLYWHEEL LOCK

(75) Inventors: David Martin Harris, Coweta, OK (US); Russell Dale Watkins, Broken Arrow, OK (US)

(73) Assignee: Reynolds French & Company, Tulsa, OK (US)

( * ) Notice: Subject to any disclaimer, the term of this patent is extended or adjusted under 35 U.S.C. 154(b) by 1967 days.

(21) Appl. No.: 11/689,192

(22) Filed: Mar. 21, 2007

(51) Int. Cl.
    *B60R 25/00* (2013.01)

(52) U.S. Cl.
    USPC .............................. 74/527; 70/245; 188/18 R

(58) Field of Classification Search
    USPC .......... 74/89.23, 89.39, 89.45, 433.5, 409.09,
    74/409.12, 473.21, 527, 572.1, 572.2,
    74/612–616; 70/226, 190, 225, 228;
    310/74, 77; 403/381; 269/43, 45, 256,
    269/271, 273; 29/281.1; 123/192.1;
    477/190, 192, 193
    See application file for complete search history.

(56) References Cited

U.S. PATENT DOCUMENTS

| 692,538 | A | * | 2/1902 | Niemeyer | 70/226 |
|---|---|---|---|---|---|
| 701,533 | A | * | 6/1902 | Bramwell | 477/208 |
| 935,345 | A | * | 9/1909 | Wiebke | 409/165 |
| 1,057,537 | A | * | 4/1913 | Poucher | 70/226 |
| 1,228,264 | A | * | 5/1917 | Toussaint | 70/312 |
| 1,370,970 | A | * | 3/1921 | Jordan | 70/245 |
| 1,434,515 | A | * | 11/1922 | Watson | 70/255 |
| 1,435,431 | A | * | 11/1922 | Tino et al. | 70/237 |
| 1,523,086 | A | * | 1/1925 | Schutza | 70/237 |
| 1,710,425 | A | * | 4/1929 | Lorimer | 477/208 |
| 1,757,270 | A |   | 5/1930 | Stinner |  |
| 1,885,370 | A | * | 11/1932 | Minkow | 269/291 |
| 1,960,930 | A | * | 5/1934 | Thomas | 83/174 |
| 2,121,869 | A | * | 6/1938 | Greenawalt | 188/2 R |
| 2,356,300 | A | * | 8/1944 | Boettcher | 269/60 |
| 2,606,461 | A |   | 8/1952 | Herndon |  |
| 3,807,034 | A | * | 4/1974 | Pevzner et al. | 29/559 |
| 3,859,863 | A | * | 1/1975 | Howlett | 74/142 |
| 4,606,193 | A |   | 8/1986 | Molina |  |
| 4,930,371 | A | * | 6/1990 | Schneider | 74/527 |
| 5,031,901 | A | * | 7/1991 | Saarinen | 482/63 |
| 5,549,183 | A | * | 8/1996 | Buchanan et al. | 188/265 |
| 6,152,437 | A | * | 11/2000 | Bauer et al. | 269/329 |
| 2003/0037548 | A1 |   | 2/2003 | Gerdes et al. |  |
| 2005/0194187 | A1 |   | 9/2005 | Gleitman et al. |  |
| 2005/0247055 | A1 |   | 11/2005 | Abouraphael |  |
| 2006/0196181 | A1 |   | 9/2006 | Nelson |  |
| 2006/0218917 | A1 |   | 10/2006 | Abou-Raphael |  |

* cited by examiner

*Primary Examiner* — Thomas Diaz

(74) *Attorney, Agent, or Firm* — Head, Johnson & Kachigian, P.C.

(57) ABSTRACT

A variable position flywheel lock for a rotating engine shaft terminating in a flywheel having plurality of radially spaced slots around the circumference. The flywheel lock includes an elongated base positioned perpendicular to a radius of the flywheel. A body is engaged with the base and is movable vertically toward or away from the base. A top is engaged with the body with the top movable parallel to the base. A toothed device extends from the top and is engageable with the radially spaced slots in the flywheel to hold the flywheel in a desired position and lock it in place.

13 Claims, 4 Drawing Sheets

VARIABLE POSITION FLYWHEEL LOCK

BACKGROUND OF THE INVENTION

1. Field of the Invention

The present invention relates to a flywheel lock capable of positioning a flywheel and accompanying rotating shaft in an almost infinite number of positions and capable of locking the flywheel and accompanying shaft in place. In particular, the present invention is directed to a flywheel lock used for critical positioning of engine parts and used in connection with maintenance and repair of large engines. The device will allow unprecedented safety in or around the engines.

2. Prior Art

Large internal combustion engines are used in a number of industrial applications, such as integral gas compressors used to compress natural gas at gas transmission stations. The engines have long shafts which rotate in bearing saddles and operate in conjunction with valves and other moving components. One end of the rotating shaft terminates in a large diameter flywheel to assist in momentum. The outside edge of the flywheel often contains a series of slots so that the radial edge is in the form of a cog. The flywheel and the shaft may each weigh several tons. Periodically, maintenance and repair work are necessary. For example, it may be necessary to position the shaft in a desired rotational position for settings such as piston end clearances and positioning of various sensors. For optimum performance, the shaft and flywheel must be precisely positioned and then held in place.

Additionally, it is critical to lock the shaft and the flywheel in place while personnel are in and around the shaft, the flywheel and other accompanying machinery. Any inadvertent movement of the shaft or the flywheel could cause dangerous conditions. This situation is avoided by attempting to lock the flywheel in place which also locks the shaft and accompanying components.

Over the years, crude arrangements have been employed, such as wooden and/or metal blocks which are jammed against the flywheel to retain the flywheel in a particular position. In one known prior art device, a post is mounted to the floor adjacent the flywheel and a threaded bolt or pin is extended through the post and in to one of the slots in the flywheel. In another known prior art device, a three toothed plate pivots on a pin parallel to the shaft and is movable toward or away from the flywheel edge. These devices suffer from a lack of strength and can only be positioned in a limited number of locations.

Braking mechanisms have also been known in the past for internal combustion engines, such as:

Herndon (U.S. Pat. No. 2,606,461) discloses a brake mechanism to prevent spinning of idling transmission elements by a braking idler body 45.

Stinner (U.S. Pat. No. 1,757,270) discloses a braking system including a brake ring 41.

Nevertheless, there remains a need for a flywheel lock device that will position a flywheel, a shaft and accompanying engine machinery in a desired rotational position.

There also remains a need for a flywheel lock device that will lock a flywheel and shaft in place during maintenance and repairs on the engine.

There also remains a need for a flywheel lock device that will provide more safety against movement than heretofore known.

SUMMARY OF THE INVENTION

The present invention is directed to a flywheel lock assembly for an engine shaft terminating in a rotating flywheel having a plurality of radially spaced slots around a circumferential edge. The flywheel lock will assist in holding a desired position of the flywheel and locking it in place.

The flywheel lock assembly includes an elongated base which is positioned perpendicular to a radius of the flywheel. The elongated base is secured to a floor or foundation by fasteners.

A body is engaged with the elongated base by a dovetail connection with the body movable vertically toward or away from the elongated base by a threaded lead screw. The threaded lead screw is rotated by a removable handle.

A top is engaged with the elongated body with the top movable in alternate directions parallel to the elongated base. The top is engaged with the body by a dovetail connection wherein the top is movable with respect to the elongated body by a threaded screw which is received in a threaded nut extending from the elongated body. The threaded screw is rotated by a removable handle.

BRIEF DESCRIPTION OF THE DRAWINGS

FIG. 2 is a perspective view of an infinite position flywheel lock shown in FIG. 1 adjacent a flywheel while

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
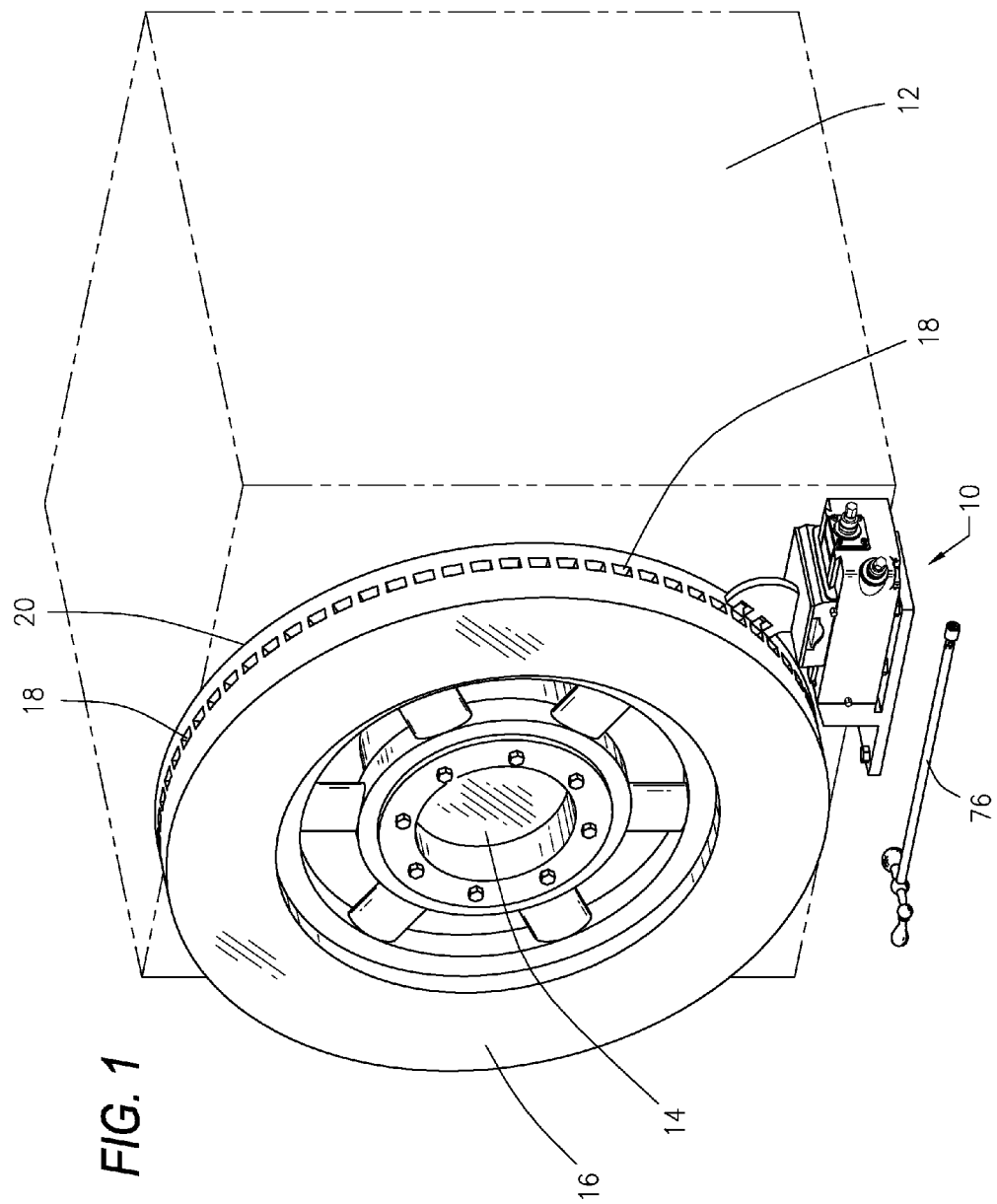
FIG. 1 is a perspective view of an infinite position flywheel lock constructed in accordance with the present invention adjacent an internal combustion engine housing and extending flywheel.

Referring to the drawings in detail, FIG. 1 illustrates a perspective view of an infinite position flywheel lock assembly 10 constructed in accordance with the present invention in place adjacent an industrial engine housing 12 (illustrated by dashed lines). An internal combustion engine may take many configurations and would be located within the housing.

The engine includes a rotating shaft 14. One end of the rotating shaft 14 terminates in a radially extending flywheel 16 that rotates in response to rotation of the shaft 14. A circumferential edge 20 of the flywheel has a plurality of cogs or slots 18 which are radially arranged or spaced around the circumferential edge.

During operation of the engine, the shaft 14 will rotate, causing the flywheel 16 to rotate. During operation, a screen, wall or cage (not shown) may also be installed or placed around the flywheel 16 to prevent personnel from coming in contact therewith.

Figure 3:
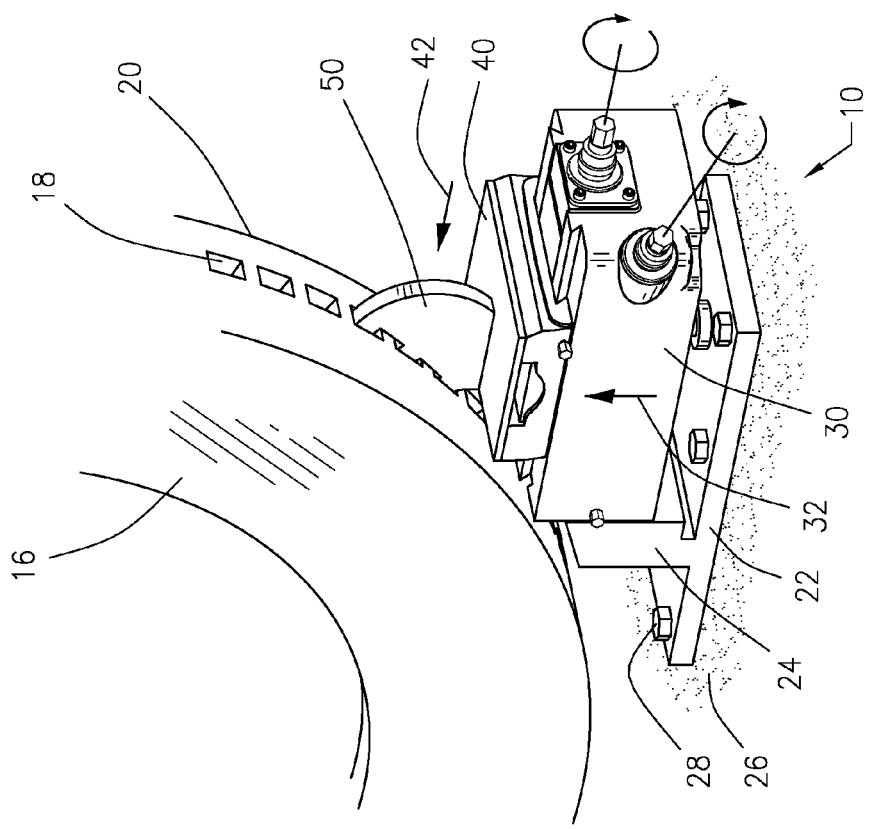
FIG. 3 is a perspective view of an infinite position flywheel lock engaged with the flywheel.
Figure 2:
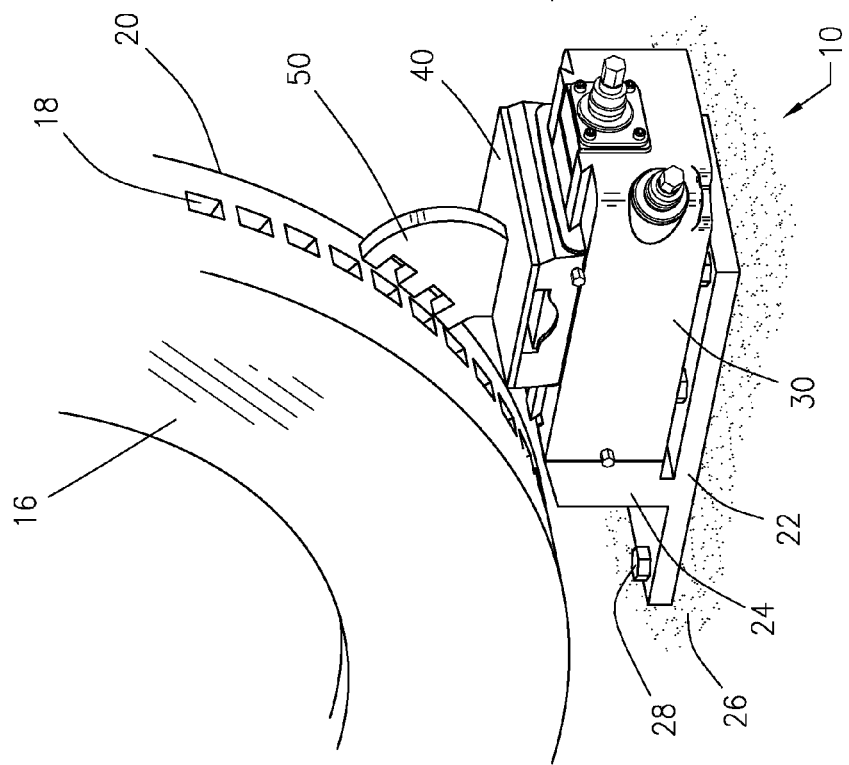

FIGS. 2 and 3 illustrate enlarged views of the infinite position flywheel lock assembly 10. FIG. 2 illustrates the flywheel lock assembly 10 adjacent the flywheel 16 while FIG. 3 illustrates the flywheel lock assembly 10 engaged with the flywheel 16. When the flywheel lock assembly is positioned as shown in FIG. 2, the flywheel 16 can rotate without interference. Conversely, when the flywheel lock assembly is positioned as shown in FIG. 3, the flywheel 16 is locked into position.

As best seen in FIGS. 2 and 3, an elongated base 22 is positioned perpendicular to a radius of the flywheel 16. As may be appreciated from the drawings, the elongated base 22 is spaced from a tangent to the circumferential edge 20 of the flywheel 16. The elongated base 22 includes an upstanding shoulder 24, to be described in detail herein.

The elongated base 22 will be secured to a floor 26 or a building foundation by fasteners 28 or by another mechanism. A body 30 of the flywheel lock assembly is engaged with the elongated base by a dovetail connection.

The body 30 is movable with respect to the elongated base vertically toward or away from the elongated base. As shown by the arrow 32 in FIG. 3, the body 30 is movable in a first direction away from the base. Accordingly, the body 30 moves from a retracted position shown in FIG. 2 to an extended position shown in FIG. 3. As will be appreciated, the body is also movable in a direction reverse to arrow 32.

A top 40 is engaged with the body 30 by a dovetail connection. The top 40 is movable with respect to the body 30 in alternate directions parallel to the elongated base. The top 40 is movable in a first direction as shown by arrow 42 in FIG. 3. The body is also movable in a direction reverse to arrow 42.

A fingered or toothed device 50 extends form the top 40. In the embodiment shown, the device 50 includes three teeth which are arranged to be received in the slots 18 around the circumference of the flywheel 16 and are somewhat radially positioned. The toothed device 50 is generally vertically arranged with respect to the top 40.

Figure 4:
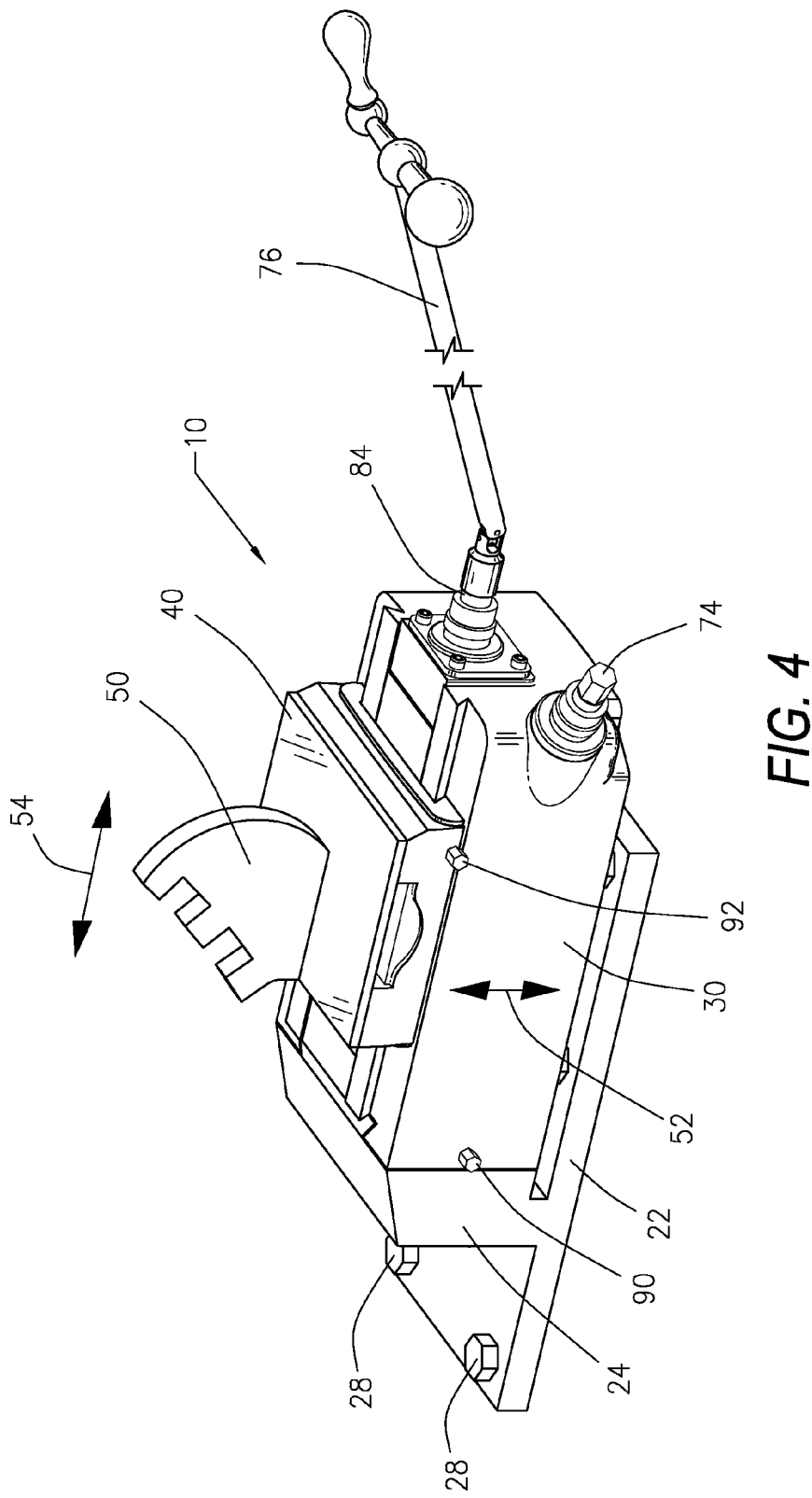
FIG. 4 is a perspective view of the infinite position flywheel lock shown in FIG. 1 apart from the flywheel.
Figure 5:
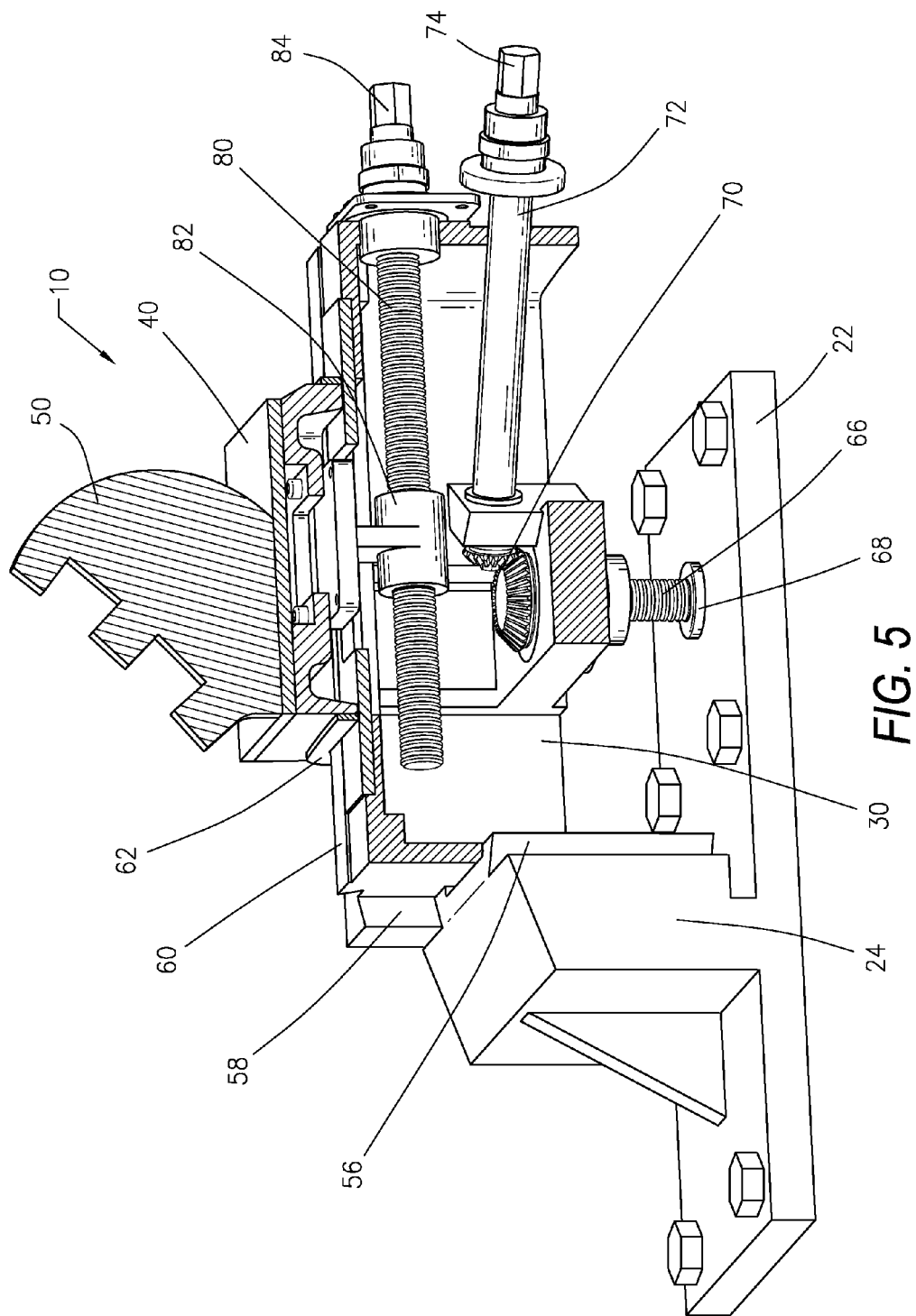
FIG. 5 is a partially cut away view of the infinite position flywheel lock as shown in FIG. 1.

FIG. 4 illustrates a perspective view of the flywheel lock assembly 10 apart from the flywheel 16 while FIG. 5 illustrates the flywheel lock assembly 10 partially cut away for ease of comprehension. The arrow 52 illustrates the alternate movements of the body 30 with respect to the elongated base. The arrow 54 illustrates the alternate movements of the top 40 with respect to the body 30. The elongated base 22 includes a vertically extending upstanding shoulder 24 which includes an extending dovetail tenon 56 which mates with a dovetail mortise 58 on the body 30 to permit and control movement of the body.

The body 30 has an extending dovetail tenon 60 which mates with a dovetail mortise 62 on the top 40 to permit and control movement of the top.

The body 30 is generally hollow to form an open interior as best seen in FIG. 5. The body 30 is movable with respect to the elongated base 22 by a threaded lead screw 66 which is received in a threaded opening 68 in the body 30.

The threaded lead screw 66 is rotated by an angle gear 70 which, in turn, is rotated by a post 72 which passes through the body terminates outside the body in a hex head end 74. As best seen in FIGS. 1 and 4, the hex head end 74 may be rotated by a removable handle 76 having a mating socket.

The top 40 is separately movable with respect to the elongated body 30 by a threaded screw 80 which is received in a threaded nut 82 which extends from the interior of the elongated body 30.

The threaded screw 80 terminates in a hex head end 84 which terminates outside of the body 30. Likewise, the hex head end 84 is rotated by a removable handle 76 having a mating socket.

Returning to consideration of FIG. 4, once the body 30 has been moved by rotating the hex head end 74 to a desired position with respect to the elongated base, a tension set screw 90 assists in retaining the body 30 in a desired position. Likewise, once the top 40 has been positioned with respect to the body by rotating the hex head end 84, a tension set screw 92 may be set to assist in retaining the top in a desired position.

In order to utilize the flywheel lock assembly 10 of the present invention, the engine will be turned off so that the flywheel 16 will be brought to a resting position. The flywheel may be moved to a desired rotational position for either operational or maintenance procedures on the engine. Thereafter, all of the starting equipment on the engine will be locked out and tagged out according to known procedures. This alerts personnel that the engine is not to be started. Thereafter, the body will be moved toward the flywheel 16 by rotating the hex head end with the handle which causes the toothed device 50 to move toward the flywheel 16. Thereafter, the top 40 and accompanying toothed device 50 will be moved toward the flywheel 16 by rotating the hex head end with the removable handle. This procedure may be done in incremental steps until the teeth of the toothed device 50 are engaged within the slots of the flywheel 16.

Once the flywheel lock assembly 10 has locked the flywheel in the desired location, the flywheel and shaft are fixed in position and procedures on the engine may be performed.

In order to disengage the flywheel lock assembly 10, the reverse procedure is employed.

Whereas, the present invention has been described in relation to the drawings attached hereto, it should be understood that other and further modifications, apart from those shown or suggested herein, may be made within the spirit and scope of this invention.

What is claimed is:

1. A variable position flywheel lock for an engine shaft terminating in a rotating flywheel having a plurality of radially spaced slots in a circumferential edge of said flywheel, which flywheel lock comprises:
    an elongated base positioned perpendicular to a radius of said flywheel;
    a body engaged with said elongated base, said body movable vertically toward or away from said base by a threaded lead screw rotated by an angle gear;
    a top engaged with said body, said top movable parallel to said elongated base by a threaded screw received in a threaded nut extending from said body; and
    a toothed device having a plurality of teeth extending from said top to engage said toothed device with said slots in said circumferential edge of said fly wheel, wherein said plurality of teeth are radially aligned with said slots.

2. A variable position flywheel lock as set forth in claim 1 wherein said body is engaged with said elongated base by a dovetail connection.

3. A variable position flywheel lock as set forth in claim 2 wherein said elongated base has an upstanding shoulder with an extending dovetail tenon wherein and said body has a dovetail mortise.

4. A variable position flywheel lock as set forth in claim 1 wherein said top is engaged with said body by a dovetail connection.

5. A variable position flywheel lock as set forth in claim 4 wherein said body has an extending dovetail tenon and wherein said top has a dovetail mortise.

6. A variable position flywheel lock as set forth in claim 1 wherein said elongated base is secured to a floor by fasteners.

7. A variable position flywheel lock as set forth in claim 1 wherein said angle gear is rotated by a post.

8. A variable position flywheel lock as set forth in claim 1 wherein said threaded screw is rotated by a removable handle.

9. A variable position flywheel lock as set forth in claim 8 wherein said threaded screw terminates in a hex head end which is rotatable by said removable handle.

10. A variable position flywheel lock as set forth in claim 1 including a tension set screw to hold said top in place with respect to said body.

11. A variable position flywheel lock for an engine shaft terminating in a rotating flywheel having a plurality of radially spaced slots in a circumferential edge of said flywheel, which flywheel lock comprises:
- an elongated base positioned perpendicular to a radius of said flywheel wherein said base has an upstanding shoulder;
- a body engaged with said base with a dovetail connection, said body movable vertically toward or away from said elongated base by a threaded lead screw;
- a top engaged with said body by a dovetail connection, said top movable parallel to said base and movable by a threaded screw; and
- a toothed device having a plurality of teeth extending from said top to engage said toothed device with said slots in said circumferential edge of said flywheel, wherein said plurality of teeth are radially aligned with said slots.

12. A variable position flywheel lock as set forth in claim 11 wherein said elongated base is secured to a floor by fasteners.

13. A variable position flywheel lock for an engine shaft terminating in a rotating flywheel having a plurality of radially spaced slots in a circumferential edge of said flywheel, which flywheel lock comprises:
- an elongated base positioned perpendicular to a radius of said flywheel;
- a body engaged with said elongated base;
- means to move said body vertically toward or away from said base;
- a top engaged with said body;
- means to move said top parallel to said elongated base; and
- a toothed device having a plurality of teeth extending from said top to engage said toothed device with said slots in said circumferential edge of said flywheel, wherein said plurality of teeth are radially aligned with said slots.

* * * * *